United States Patent [19]

Betz

[11] 3,994,831

[45] Nov. 30, 1976

[54] METALLIC CATALYST SUPPORT AND CATALYTIC METAL COATED ON SAME

[76] Inventor: Erwin C. Betz, 524 Mill Valley Road, Palatine, Ill. 60067

[22] Filed: Sept. 2, 1975

[21] Appl. No.: 609,250

[52] U.S. Cl.................................. 252/458; 252/465; 252/470; 252/472; 252/477 R; 423/245
[51] Int. Cl.².................... B01J 21/02; B01J 21/06; B01J 23/86; B01J 35/02
[58] Field of Search................ 252/477 R, 458, 465, 252/470, 472; 75/126 R; 29/180 E, 180 SS, 196.6; 423/245, 247

[56] References Cited
UNITED STATES PATENTS

| | | | |
|---|---|---|---|
| 2,756,121 | 7/1956 | Grimes | 423/245 |
| 2,974,150 | 3/1961 | McClements et al. | 252/477 R |

*Primary Examiner*—W. J. Shine
*Attorney, Agent, or Firm*—Hume, Clement, Brinks, Willian, Olds & Cook, Ltd.

[57] ABSTRACT

A perforated catalyst support formed in the shape of Lessing ring is disclosed. Also disclosed is a method of converting hydrocarbon waste gas streams which utilizes a catalyst supported on the perforated Lessing ring.

10 Claims, 3 Drawing Figures

METALLIC CATALYST SUPPORT AND CATALYTIC METAL COATED ON SAME

BACKGROUND OF THE INVENTION

This invention relates to an improved metallic catalyst support and to a method of converting hydrocarbon waste gas streams to carbon dioxide and water which utilizes this improved metallic catalyst support.

Under modern pollution control regulations, many waste gas streams which contain minor amounts of hydrocarbons require final clean-up and at least substantial conversion to carbon dioxide and water before they can be released to the atmosphere. In particular, in the oxidation of ethylene to ethylene oxide, a by-product vent gas stream containing about 1% by volume of ethylene is removed from the reactor system. The ethylene contained in this waste stream is of too low a concentration to be recycled and is normally vented to the atmosphere. However, in many localities, the ethylene contained in this stream must be converted to carbon dioxide and water before being released. Similar problems are encountered with the naphtha based solvents which are used in a wide variety of applications.

One method that has been frequently used in the past to treat these waste gas streams is to pass them through a catalyst bed containing a catalytically active metal catalyst such as platinum, palladium or the like. While many different types of catalyst supports have been used for the catalytically active metals, a frequently used support is a crimped metal ribbon. While this type of packed catalyst bed is successful in converting a large percentage of the hydrocarbon in the waste gas to carbon dioxide and water, it falls short of total conversion. Accordingly, there is a need for catalysts and/or catalyst supports which will promote higher rates of conversion.

SUMMARY OF THE INVENTION

This invention relates to a metallic catalyst support which is perforated and is formed in the shape of a Lessing ring. When a catalytically active metal such as platinum and/or palladium is applied to this perforated Lessing ring and a plurality of these rings are placed in a packed catalyst bed, higher conversion rates of hydrocarbon waste gases are attained at any given catalyst bed temperature than for the crimped metal ribbon catalyst support generally used heretofore. This surprisingly high conversion rate is also greater than that which can be attained using a non-perforated Lessing ring at any given average catalyst bed temperature, particularly at lower average catalyst bed temperatures on the order of 100°–300° C. In fact, the conversion rate is so high that some waste gas streams are essentially completely converted to carbon dioxide and water even at relatively low catalyst bed temperatures.

Another aspect of this invention relates to a method of converting hydrocarbons in waste gas streams to carbon dioxide and water utilizing the perforated catalyst support of this invention. In particular, this invention relates to a method of converting the ethylene contained in a vent gas stream to carbon dioxide and water at essentially 100% conversion. This invention also relates to a method of converting waste gas streams containing naphtha-like solvents at higher conversion rates than can be attained with the other types of catalyst supports generally used heretofore.

DESCRIPTION OF PREFERRED EMBODIMENTS

The term "Lessing ring" as used herein is itself well known and has been used to define a particular shape for a non-perforated packing material. See, for example, Perry's Chemical Engineering Handbook, page 18–26 (4th Ed. 1963). My invention is directed to a perforated catalyst support shaped like a Lessing ring.

Figure 1:
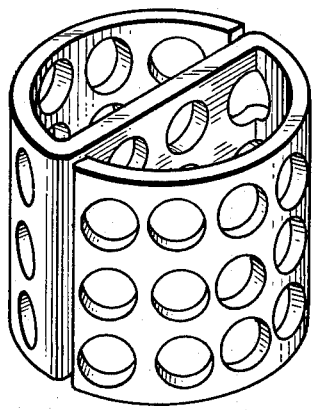

FIG. 1 is an enlarged perspective view of one embodiment of the perforated Lessing ring catalyst support of my invention. As the figure shows, the perforated Lessing ring shape is an essentially closed perforated cylinder which is bisected by a perforated surface. The particular embodiment shown in FIG. 1 is formed like an S in which the ends are extended to form the two semi-circular enclosures.

Figure 2:
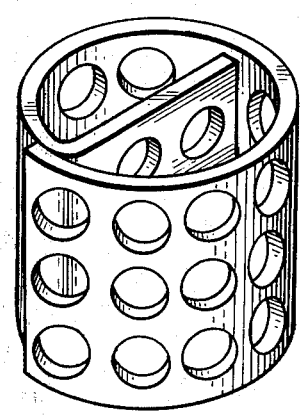

FIG. 2 is an enlarged perspective view of another embodiment of the perforated Lessing ring catalyst support of my invention. In this embodiment, the catalyst support is formed into an essentially closed ring which has an extension of one end folded into the enclosure formed by the ring and which almost completely bisects the ring.

The perforated Lessing ring of this invention is advantageously formed from a metallic ribbon which has already been perforated and coated with the active catalytic agent. Preferably, the ribbon is from about 0.005 to 0.01 in. thick and is from about 1/16 to about ¼ inch wide. The perforations are advantageously very small, being on the order of about 1 to 5 mm in diameter. The solid metallic ribbon is advantageously perforated by means of a laser beam. The preferred diameter of the perforated Lessing ring itself ranges from about ⅛ inch to ⅜ inch.

Advantageously, the metal ribbon from which the perforated Lessing ring of this invention is formed is a mixed alloy ribbon. Particularly advantageous combinations include ribbons made from nickel-chromium-iron, aluminum-chromium-iron, and chromium-silicon-iron alloys. Virtually any active catalytic metal may be applied to the catalyst support of this invention. Included among such catalytic metals are the elements of Group VIII of the Periodic Table, the rare earths, and other metals including silver, titanium, manganese, copper, chromium, cadmium, molybdenum, vanadium, tungsten, rhenium, thorium, and actinium. Particularly preferred active catalytic agents are platinum and palladium or mixtures thereof. The preferred methods of catalyst preparation are those disclosed in U.S. Pat. No. 2,720,494 to H.R. Suter and R. J. Ruff or in U.S. Pat. No. 3,712,856 to the present inventor, the disclosure of which is incorporated herein by reference.

The perforated Lessing rings of this invention are advantageously employed in catalyst beds packed with a plurality of such rings. Such packed catalyst beds are not limited to any particular size or shape and may, for example, be pipe-, tube-, cylindrical- or rectangular-shaped beds. The density of packing may also extend across a wide range, although a closely packed bed is preferred.

Active catalytic metal catalysts supported on the perforated Lessing rings of this invention produce extremely high conversion rates for hydrocarbons present in minor amounts in waste gas streams. For some systems, the conversion of the hydrocarbon waste gas to carbon dioxide and water is essentially total.

The perforated Lessing ring support of this invention coated with a platinum-palladium mixture is particularly advantageous for the conversion of the minor amounts of ethylene contained in a vent gas stream removed during the conversion of ethylene to ethylene oxide. Essentially complete conversion of ethylene to carbon dioxide and water can be obtained at temperatures as low as about 175° C when the perforated Lessing ring catalyst support of this invention is used. This reaction can be carried out at atmospheric pressure and at temperatures on the order of 100°–400° C. The normal concentration of ethylene in the waste gas stream is from about 0.2 to 1.5% by volume, the remainder being air. The average hourly space velocities useful in this reaction can range from as low as about 1,000 upwards to about 25,000.

The perforated Lessing ring catalyst support of this invention is also extremely advantageous in the cleanup of waste gas streams containing naphtha-like solvents. In the conversion of naphtha-like waste gas streams to carbon dioxide and water, the perforated Lessing rings described above produce higher conversion rates than can be attained using either the crimped metal ribbon or a solid metal Lessing ring.

EXAMPLE I

Figure 3:
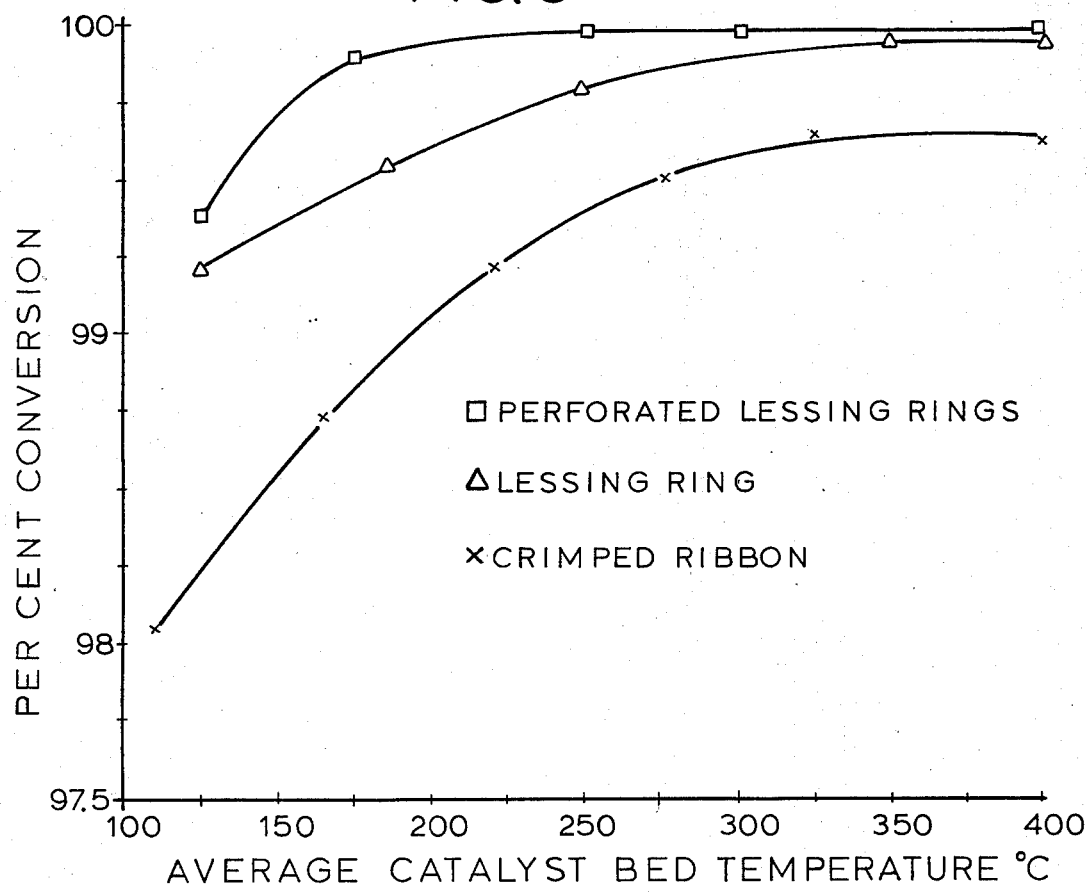

FIG. 3 shows the results of a series of experiments for the conversion of ethylene to carbon dioxide and water. This series of experiments indicates the improved conversion which can be attained when a catalytically active metal is applied to the perforated Lessing ring catalyst support of this invention. These experiments were carried out under the same reaction conditions and utilized the same type of catalyzed metallic ribbon which were then formed into different shapes.

In this series of experiments, the ethylene concentration in the feed stream was 0.8% by volume while the remainder of the feed stream was air. The metal ribbon used to form the crimped ribbons, solid band Lessing rings and the perforated Lessing rings was made from a chromium, aluminum, and iron temperature resistant alloy. The ribbon was approximately ¼ inch wide. The catalyst support ribbon was coated with a mixture of platinum and palladium. The method of coating the metal ribbon is described in U.S. Pat. No. 3,712,856. The crimped ribbon strands used in the experiments was crimped so that it was approximately ¼ inch high and had repeating peaks about every ¼ inch. These crimped strands were approximately 2½ inch long. The solid band Lessing rings had an internal diameter of approximately ¼ inch. The perforated Lessing rings also had an inside diameter of approximately ¼ inch and had perforations having diameters on the order of 2 mm. The perforated Lessing rings were formed so that they had the configuration shown in FIG. 1.

The individual types of catalysts were prepared as indicated above and were placed in a packed bed catalyst cartridge. The ethylene containing gas stream was passed through this catalyst cartridge at an hourly space velocity of 15,000 (ft$^3$/hr per ft$^3$ of catalyst bed including voids). Constant temperature reaction conditions were utilized at atmospheric pressure. The ethylene concentration in the the feed gas and in the product stream was measured with an IPM model RS5 flame ionization detector manufactured by Inginingur Productions Gruppe Muenchen of Munich, Germany.

The results of these experiments are plotted in FIG. 3. As is shown in that Figure, the catalyst supported on the perforated Lessing rings resulted in a higher ethylene conversion rate at all of the catalyst bed temperatures tested. The catalyst supported on the perforated Lessing rings also produced an essentially 100% conversion at temperatures as low as 175° C while such conditions were not achieved for the catalyst supported on the solid band Lessing ring below average catalyst bed temperatures of about 300° C. Such high rates of conversion were never achieved with the catalyst supported on the crimped metal ribbon.

EXAMPLE II

A similar set of experiments was made utilizing petroleum naphtha rather than ethylene. The same type catalyst and catalyst supports were used as were constant temperature conditions. Again, the same trend was observed; namely, the catalyst supported on the perforated Lessing rings produced a higher percent conversion over the entire catalyst bed temperature range than either the solid band Lessing ring or the crimped ribbon supported catalysts.

Obviously, many modifications and variations of the invention as hereinbefore set forth will occur to those skilled in the art, and it is intended to cover in the appended claims all such modifications and variations as fall within the true spirit and scope of my invention.

I claim:
1. A metallic catalyst support having perforations and formed in the shape of a Lessing ring.
2. The catalyst support of claim 1, wherein the support is made from perforated metal ribbon.
3. The catalyst support of claim 1, wherein the metal is an alloy of nickel, chromium and iron; aluminum, chromium and iron; or chromium, silicon and iron.
4. The catalyst support of claim 1, wherein the surfaces of the catalyst support are coated with a catalytically active metal.
5. The catalyst support of claim 4, wherein the catalytically active metal is a mixture of platinum and palladium.
6. The catalyst support of claim 1, wherein the metal is an alloy of nickel, chromium, and iron; aluminum, chromium, and iron; or chromium, silicon, and iron and the surfaces of the catalyst support are coated with a mixture of platinum and palladium.
7. The catalyst support of claim 1, wherein the cylinder and the bisecting surface are shaped as an S in which the ends of the S are extended to form the essentially closed cylinder portion of the support.
8. The catalyst support of claim 1, wherein a strip of perforated metal is formed into the essentially closed cylinder and the bisecting surface is formed by extending one end of the strip into the enclosure formed by the cylinder.
9. The catalyst support of claim 7, wherein the surfaces of the support are coated with a mixture of platinum and palladium and wherein the metal is an alloy of nickel, chromium, and iron; aluminum, chromium, and iron; or chromium, silicon, and iron.
10. The catalyst support of claim 8, wherein the metal is an alloy of nickel, chromium, and iron; aluminum, chromium, and iron; or chromium, silicon, and iron and the metal is coated with a mixture of platinum and palladium.

* * * * *